(12) United States Patent
Seitoku et al.

(10) Patent No.: US 11,787,942 B2
(45) Date of Patent: Oct. 17, 2023

(54) POLYIMIDE PRECURSOR SOLUTION, METHOD FOR PRODUCING POROUS POLYIMIDE FILM, POROUS POLYIMIDE FILM, AND INSULATED WIRE

(71) Applicant: FUJIFILM Business Innovation Corp., Tokyo (JP)

(72) Inventors: Shigeru Seitoku, Kanagawa (JP);
Kosuke Nakada, Kanagawa (JP);
Takeshi Iwanaga, Kanagawa (JP);
Hidekazu Hirose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/591,983

(22) Filed: Feb. 3, 2022

(65) Prior Publication Data
US 2023/0080755 A1  Mar. 16, 2023

(30) Foreign Application Priority Data
Sep. 3, 2021 (JP) .................................. 2021-143868

(51) Int. Cl.
*C08L 79/08* (2006.01)
*H01B 3/30* (2006.01)
*C08J 9/26* (2006.01)

(52) U.S. Cl.
CPC ............... *C08L 79/08* (2013.01); *C08J 9/26* (2013.01); *H01B 3/306* (2013.01); *C08J 2201/046* (2013.01); *C08J 2367/02* (2013.01); *C08J 2379/08* (2013.01); *C08L 2203/16* (2013.01); *C08L 2203/202* (2013.01); *C08L 2205/18* (2013.01); *C08L 2205/22* (2013.01)

(58) Field of Classification Search
CPC ................ C08L 79/08; C08L 2203/16; C08L 2203/202; C08L 2205/22; C08L 2205/18; C08L 67/02; H01B 3/306; C08J 9/26; C08J 2201/046; C08J 2367/02; C08J 2379/08; C09D 167/02; C09D 179/08; C08G 63/183; C08G 73/1032; C08G 73/1067
See application file for complete search history.

(56) References Cited

U.S. PATENT DOCUMENTS

2017/0266892 A1\* 9/2017 Nukada ................. C08J 7/043
2020/0274126 A1\* 8/2020 Sugahara ............ H01M 10/052
2021/0070939 A1\* 3/2021 Yoshimura ......... C08G 73/1003

FOREIGN PATENT DOCUMENTS

| JP | 2016183333 A | * 10/2016 | .......... B29C 67/202 |
| JP | 2017-183076 A | 10/2017 | |
| JP | 2018-203840 A | 12/2018 | |

\* cited by examiner

Primary Examiner — John D Freeman
(74) Attorney, Agent, or Firm — Oliff PLC

(57) ABSTRACT

A polyimide precursor solution includes: a polyimide precursor; polyester resin particles containing a polyester resin and having a volume average particle diameter of from 3 µm to 50 µm inclusive and an average circularity of 0.970 or more; and a solvent.

10 Claims, 1 Drawing Sheet

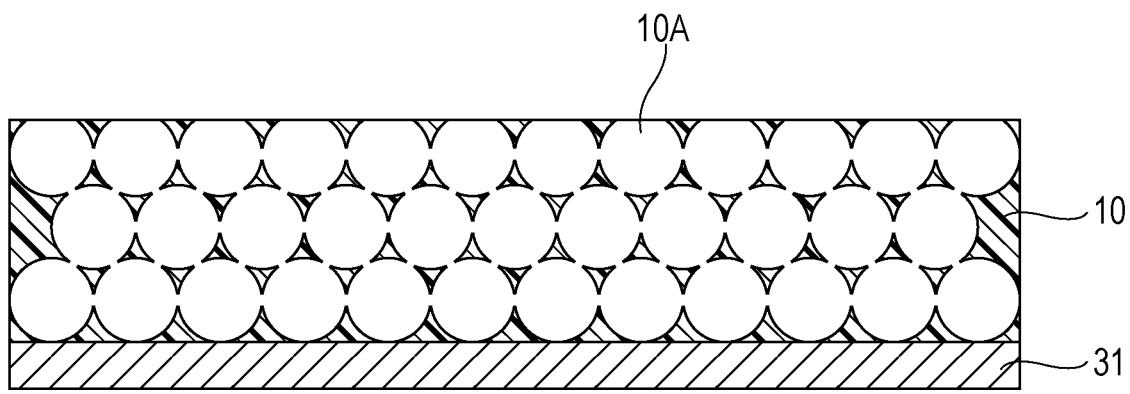

US 11,787,942 B2

POLYIMIDE PRECURSOR SOLUTION, METHOD FOR PRODUCING POROUS POLYIMIDE FILM, POROUS POLYIMIDE FILM, AND INSULATED WIRE

CROSS-REFERENCE TO RELATED APPLICATIONS

This application is based on and claims priority under 35 USC 119 from Japanese Patent Application No. 2021-143868 filed Sep. 3, 2021.

BACKGROUND

(i) Technical Field

The present disclosure relates to a polyimide precursor solution, a method for producing a porous polyimide film, a porous polyimide film, and an insulated wire.

(ii) Related Art

Japanese Unexamined Patent Application Publication No. 2018-203840 discloses an insulating varnish used to form a porous insulating coating of an insulated wire that is disposed on the outer circumferential side of a linear conductor. The insulating varnish contains: a mother liquid containing a solvent and an insulating resin or a precursor thereof dissolved in the solvent; and thermally decomposable resin particles dispersed in the mother liquid. The sedimentation velocity per 30 days of the thermally decomposable resin particles in the mother liquid is in a specific range.

Japanese Unexamined Patent Application Publication No. 2017-183076 discloses an insulated wire including a linear conductor and an expandable layer that is stacked on the outer circumferential side of the conductor directly or with another layer therebetween and expands when heated. The expandable layer includes: a matrix composed mainly of a phenoxy resin; and a chemical foaming agent or thermally expandable microcapsules dispersed in the matrix. The phenoxy resin has a bisphenol A-type skeleton and a bisphenol F-type skeleton in the same or different molecules, and the average thickness expansion coefficient of the expandable layer after heating is in a specific range.

SUMMARY

A porous film used as an insulating coating of an insulated wire is required to have high insulating properties while high heat resistance and strength are maintained. In one example of a method for forming a porous polyimide film having high insulating properties, particles such as thermally decomposable resin particles are added to a varnish containing a polyimide precursor, and the particles are removed by thermal decomposition. Through these steps, the porous polyimide film is formed.

Aspects of non-limiting embodiments of the present disclosure relate to a polyimide precursor solution containing a polyimide precursor, polyester resin particles, and a solvent. A porous polyimide film obtained using this polyimide precursor solution has higher insulating properties than when the resin particles include only acrylic resin particles, when the resin particles have a volume average particle diameter of less than 3 μm, when the resin particles have an average circularity of less than 0.970, or when the viscosity of a dispersion obtained by adding 30 parts by mass of the polyester resin particles to 100 parts by mass of water is more than 10 mPa·s at 25° C.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a polyimide precursor solution including: a polyimide precursor; polyester resin particles containing a polyester resin and having a volume average particle diameter of from 3 μm to 50 μm inclusive and an average circularity of 0.970 or more; and a solvent.

BRIEF DESCRIPTION OF THE DRAWING

Exemplary embodiments of the present disclosure will be described in detail based on the following figure, wherein:

FIG. 1 is a schematic illustration showing the form of a porous polyimide film obtained using a polyimide precursor solution in an exemplary embodiment.

DETAILED DESCRIPTION

A description will be given of exemplary embodiments of the present disclosure. The description and Examples are illustrative of the exemplary embodiments and are not intended to limit the scope of the exemplary embodiments.

In a set of numerical ranges expressed in a stepwise manner in the present specification, the upper or lower limit in one numerical range may be replaced with the upper or lower limit in another numerical range in the set. Moreover, in a numerical range described in the present specification, the upper or lower limit in the numerical range may be replaced with a value indicated in an Example.

In the present specification, the term "step" is meant to include not only an independent step but also a step that is not clearly distinguished from other steps so long as the prescribed purpose of the step can be achieved.

Any component may include a plurality of materials corresponding to the component.

When reference is made to the amount of a component in a composition, if the composition contains a plurality of materials corresponding to the component, the amount means the total amount of the plurality of materials, unless otherwise specified.

In the exemplary embodiments, the term "film" is a concept that encompasses not only components generally referred to as "films" but also components generally referred to as "membranes" and "sheets."

[Polyimide Precursor Solution]
<First Form>

A polyimide precursor solution according to a first form contains: a polyimide precursor; polyester resin particles containing a polyester resin and having a volume average particle diameter of from 3 μm to 50 μm inclusive and an average circularity of 0.970 or more; and a solvent. Hereinafter, the polyester resin particles containing the polyester resin and having a volume average particle diameter of from 3 μm to 50 μm inclusive and an average circularity of 0.970 or more are referred to also as "first polyester resin particles."

With the polyimide precursor solution according to the first form that has the above-described structure, a porous polyimide film having high insulating properties can be obtained. The reason for this is unclear but may be as follows.

As described above, a porous polyimide film is formed, for example, by adding particles such as thermally decomposable particles to a varnish containing a polyimide precursor and then removing the particles by thermal decomposition. Therefore, depending on the material of the thermally decomposable particles, decomposition products generated by the thermal decomposition of the thermally decomposable particles may remain present in the porous polyimide film formed, causing deterioration of its insulating properties.

Moreover, depending on the material of the thermally decomposable particles, it may be difficult for the particles obtained to have a volume average particle diameter of 3 μm or more and an average circularity of 0.970 or more.

However, in the first form, the first polyester resin particles are used as the thermally decomposable particles. Even when the polyester resin contained in the first polyester resin particles is subjected to thermal decomposition, decomposition products are less likely to remain. Therefore, deterioration of the insulating properties of the porous polyimide film due to the remaining decomposition products is unlikely to occur.

Thermally decomposable particles having a large particle diameter and a high average circularity can be easily obtained when a polyester resin is used to form the particles. When the volume average particle diameter of the polyester resin particles used as the thermally decomposable particles is from 3 μm to 50 μm inclusive, the diameter of the pores in the porous polyimide film to be obtained is larger than when the volume average particle diameter is below the above range, and segregation of the pores can be prevented. Specifically, when the surface area of the polyester resin particles is large and their shape is close to spherical, the area of contact between the particles is small, and aggregation of the particles is inhibited, so that segregation of the pores in the porous polyimide film obtained is prevented. As described above, the diameter of the pores is large, and the segregation of the pores is prevented. This may easily allow the porous polyimide film obtained to have high insulating properties. When the average circularity of the polyester resin particles used as the thermally decomposable particles is 0.970 or more, the shape of the pores in the porous polyimide film obtained is closer to a spherical shape than when the average circularity is below the above range. When the shape of the pores is close to a spherical shape, connection, segregation, etc. of the pores are inhibited. This may easily allow the porous polyimide film obtained to have high insulating properties.

As described above, it is inferred that, in the first form, the porous polyimide film to be obtained has high insulating properties.

<Second Form>

A polyimide precursor solution according to a second form contains: a polyimide precursor; polyester resin particles containing a polyester resin and having a viscosity of 10 mPa·s or less at 25° C., the viscosity being a viscosity of a dispersion prepared by adding 30 parts by mass of the polyester resin particles to 100 parts by mass of water (this viscosity is hereinafter referred to as "specific viscosity"); and a solvent.

Hereinafter, the polyester resin particles containing the polyester resin and having a specific viscosity of 10 mPa·s or less are referred to also as "second polyester resin particles."

With the polyimide precursor solution according to the second form that has the above-described structure, a porous polyimide film having high insulating properties can be obtained. The reason for this is unclear but may be as follows.

As described above, a porous polyimide film is formed, for example, by adding particles such as thermally decomposable particles to a varnish containing a polyimide precursor and then removing the particles by thermal decomposition. Therefore, depending on the material of the thermally decomposable particles, decomposition products generated by the thermal decomposition of the thermally decomposable particles may remain present in the porous polyimide film formed, causing deterioration of its insulating properties.

Moreover, as described above, to obtain a porous polyimide film having high insulating properties, thermally decomposable particles having a large volume average particle diameter and a high average circularity may be used because large diameter pores having a shape close to a spherical shape are obtained. The specific viscosity of particles having a large volume average particle diameter and a high average circularity tends to be lower than that of particles having a small volume average particle diameter and that of particles having a low average circularity, when the same material is used for all the above particles. Specifically, to obtain a porous polyimide film having high insulating properties, thermally decomposable particles having a low specific viscosity may be used. More specifically, in the thermally decomposable particles used, the viscosity of a dispersion prepared by adding 30 parts by mass of the thermally decomposable particles to 100 parts by mass of water may be 10 mPa·s or less at 25° C. However, depending on the material of the thermally decomposable particles, it may be difficult for the particles obtained to have a specific viscosity of 10 mPa·s or less.

However, in the second form, the second polyester resin particles are used as the thermally decomposable particles. Even when the polyester resin contained in the second polyester resin particles is subjected to thermal decomposition, decomposition products are less likely to remain. Therefore, deterioration of the insulating properties of the porous polyimide film due to the remaining decomposition products is unlikely to occur.

Thermally decomposable particles having a specific viscosity of 10 mPa·s or less can be easily obtained when a polyester resin is used to form the particles. When the specific viscosity of the polyester resin particles used as the thermally decomposable particles is 10 mPa·s or less, aggregation of the particles may be inhibited because the viscosity of the particles is low, and the particles may be more easily dispersed than those having a specific viscosity beyond the above range. Therefore, segregation of the pores in the porous polyimide film obtained is prevented. This may easily allow the porous polyimide film obtained to have high insulating properties.

Moreover, the polyester resin particles having a specific viscosity of 10 mPa·s or less have a larger volume average particle diameter and a larger average circularity than polyester resin particles having a specific viscosity beyond the above range. When the volume average particle diameter of the polyester resin particles is large, the diameter of the pores in the porous polyimide film to be obtained is larger than when the volume average particle diameter of the polyester resin particles is small, and segregation of the pores can be prevented. This may easily allow the porous polyimide film obtained to have high insulating properties.

When the average circularity of the polyester resin particles is large, the area of contact between the particles is smaller than when the average circularity is small, and aggregation of the particles is inhibited, so that segregation of the pores in the porous polyimide film obtained is prevented. Since the shape of the pores in the porous polyimide film obtained is close to a spherical shape, connection, segregation, etc. of the pores are inhibited. This may easily allow the porous polyimide film obtained to have high insulating properties.

As described above, it is inferred that, in the second form, the porous polyimide film to be obtained has high insulating properties.

In the following description, a polyimide precursor solution corresponding to both the polyimide precursor solution according to the first form and the polyimide precursor solution according to the second form is referred to as a "polyimide precursor solution according to the present exemplary embodiment." However, the polyimide precursor solution of the present disclosure may be, for example, a polyimide precursor solution corresponding to at least one of the polyimide precursor solution according to the first form and the polyimide precursor solution according to the second form.

Polyester resin particles corresponding to both the first polyester resin particles and the second polyester resin particles may be referred to as "specific polyester resin particles."

Hereinafter, components contained in the polyimide precursor solution according to the present exemplary embodiment will be described in detail.

<Polyimide Precursor>

The polyimide precursor solution in the present exemplary embodiment contains the polyimide precursor that is a polymer of a tetracarboxylic dianhydride and a diamine compound. The polyimide precursor is, for example, a polymer prepared by polymerizing a tetracarboxylic dianhydride and a diamine compound at a molar ratio of 1:1. The polyimide precursor includes, for example, a unit derived from the tetracarboxylic dianhydride and a unit derived from the diamine compound.

Examples of the polyimide precursor include a resin (polyimide precursor) having a repeating unit represented by general formula (I).

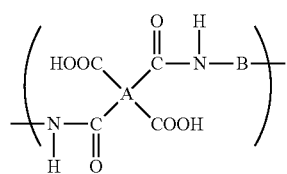

(In general formula (I), A represents a tetravalent organic group, and B represents a divalent organic group.)

In general formula (I), the tetravalent organic group represented by A is a residue obtained by removing four carboxyl groups from the tetracarboxylic dianhydride used as a raw material.

The divalent organic group represented by B is a residue obtained by removing two amino groups from the diamine compound used as a raw material.

Specifically, the polyimide precursor having the repeating unit represented by general formula (I) is a polymer of a tetracarboxylic dianhydride and a diamine compound.

Examples of the tetracarboxylic dianhydride include aromatic compounds and aliphatic compounds. From the viewpoint of obtaining a porous polyimide film having high mechanical strength, the tetracarboxylic dianhydride may be an aromatic compound. Specifically, in general formula (I), the tetravalent organic group represented by A may be an aromatic organic group.

Examples of the aromatic tetracarboxylic dianhydride include pyromellitic dianhydride, 3,3□,4,4□-benzophenonetetracarboxylic dianhydride, 3,3□,4,4□-biphenylsulfonetetracarboxylic dianhydride, 1,4,5,8-naphthalenetetracarboxylic dianhydride, 2,3,6,7-naphthalenetetracarboxylic dianhydride, 3,3□,4,4□-biphenylethertetracarboxylic dianhydride, 3,3□,4,4□-dimethyldiphenylsilanetetracarboxylic dianhydride, 3,3□,4,4□-tetraphenylsilanetetracarboxylic dianhydride, 1,2,3,4-furantetracarboxylic dianhydride, 4,4□-bis(3,4-dicarboxyphenoxy)diphenylsulfide dianhydride, 4,4□-bis(3,4-dicarboxyphenoxy)diphenylsulfone dianhydride, 4,4□-bis(3,4-dicarboxyphenoxy)diphenylpropane dianhydride, 3,3□,4,4□-perfluoroisopropylidenediphthalic dianhydride, 3,3□,4,4□-biphenyltetracarboxylic dianhydride, 2,3,3□,4□-biphenyltetracarboxylic dianhydride, bis(phthalic acid) phenylphosphine oxide dianhydride, p-phenylene-bis(triphenylphthalic)dianhydride, m-phenylene-bis(triphenylphthalic)dianhydride, bis(triphenylphthalic acid)-4,4□-diphenyl ether dianhydride, bis(triphenylphthalic acid)-4,4□-diphenylmethane dianhydride, 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Examples of the aliphatic tetracarboxylic dianhydride include butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride.

Of these, the tetracarboxylic dianhydride may be an aromatic tetracarboxylic dianhydride. Specifically, the tetracarboxylic dianhydride is, for example, preferably pyromellitic dianhydride, 3,3□,4,4□-biphenyltetracarboxylic dianhydride, 2,3,3□,4□-biphenyltetracarboxylic dianhydride, 3,3□,4,4□-biphenylethertetracarboxylic dianhydride, or 3,3□,4,4□-benzophenonetetracarboxylic dianhydride, more preferably pyromellitic dianhydride, 3,3□,4,4□-biphenyltetracarboxylic dianhydride, or 3,3□,4,4□-benzophenonetetracarboxylic dianhydride, and particularly preferably 3,3□,4,4□-biphenyltetracarboxylic dianhydride.

One tetracarboxylic dianhydride may be used alone, or two or more tetracarboxylic dianhydrides may be used in combination.

When two or more tetracarboxylic dianhydrides are used in combination, a combination of aromatic tetracarboxylic dianhydrides or a combination of aliphatic tetracarboxylic acids may be used, or a combination of an aromatic tetracarboxylic dianhydride and an aliphatic tetracarboxylic dianhydride may be used.

The diamine compound has two amino groups in its molecular structure. Examples of the diamine compound include aromatic compounds and aliphatic compounds.

From the viewpoint of obtaining a porous polyimide film having high mechanical strength, the diamine compound may be an aromatic compound. Specifically, the divalent organic group represented by B in general formula (I) may be an aromatic organic group.

Examples of the diamine compound include: aromatic diamines such as p-phenylenediamine, m-phenylenediamine, 4,4□-diaminodiphenylmethane, 4,4□-diaminodiphenylethane, 4,4□-diaminodiphenyl ether, 4,4□-diaminodiphenyl sulfide, 4,4□-diaminodiphenylsulfone, 1,5-diaminonaphthalene, 3,3-dimethyl-4,4□-diaminobiphenyl, 5-amino-1-(4□-aminophenyl)-1,3,3-trimethylindan, 6-amino-1-(4□-aminophenyl)-1,3,3-trimethylindan, 4,4□-diaminobenzanilide, 3,5-diamino-3□-trifluoromethylbenzanilide, 3,5-diamino-4□-trifluoromethylbenzanilide, 3,4□-diaminodiphenyl ether, 2,7-diaminofluorene, 2,2-bis(4-aminophenyl)hexafluoropropane, 4,4□-methylene-bis(2-chloroaniline), 2,2□,5,5□-tetrachloro-4,4□-diaminobiphenyl, 2,2□-dichloro-4,4□-diamino-5,5□-dimethoxybiphenyl, 3,3□-dimethoxy-4,4□-diaminobiphenyl, 4,4□-diamino-2,2□-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4□-bis(4-aminophenoxy)-biphenyl, 1,3□-bis(4-aminophenoxy)benzene, 9,9-bis(4-aminophenyl)fluorene, 4,4□-(p-phenyleneisopropylidene)bisaniline, 4,4□-(m-phenyleneisopropylidene)bisaniline, 2,2□-bis[4-(4-amino-2-trifluoromethylphenoxy)phenyl]hexafluoropropane, and 4,4□-bis[4-(4-amino-2-trifluoromethyl)phenoxy]-octafluorobiphenyl; aromatic diamines, such as diaminotetraphenylthiophene, having two amino groups bonded to an aromatic ring and a hetero atom other than the nitrogen atoms in the amino groups; and aliphatic diamines and alicyclic diamines such as 1,1-m-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,0$^{2,7}$]-undecylenedimethyldiamine, and 4,4□-methylenebis(cyclohexylamine).

Of these, the diamine compound may be an aromatic diamine compound. Specifically, the diamine compound is preferably p-phenylenediamine, m-phenylenediamine, 4,4□-diaminodiphenylmethane, 4,4□-diaminodiphenyl ether, 3,4□-diaminodiphenyl ether, 4,4□-diaminodiphenyl sulfide, or 4,4□-diaminodiphenylsulfone and particularly preferably 4,4□-diaminodiphenyl ether or p-phenylenediamine.

One diamine compound may be used alone, or two or more diamine compounds may be used in combination. When two or more diamine compounds are used in combination, a combination of aromatic diamine compounds or a combination of aliphatic diamine compounds may be used, or a combination of an aromatic diamine compound and an aliphatic diamine compound may be used.

The polyimide precursor may be any of various polymers including a polymer of an aromatic tetracarboxylic dianhydride and an aromatic diamine compound, a polymer of an aromatic tetracarboxylic dianhydride and an aliphatic diamine compound, a polymer of an aliphatic tetracarboxylic dianhydride and an aromatic diamine compound, and a polymer of an aliphatic tetracarboxylic dianhydride and an aliphatic diamine compound. From the viewpoint of obtaining a porous polyimide film having high mechanical strength, the polyimide precursor may be a polymer of an aromatic tetracarboxylic dianhydride and an aromatic diamine compound.

The weight average molecular weight of the polyimide precursor used in the present exemplary embodiment is preferably from 5000 to 300000 inclusive and more preferably from 10000 to 150000 inclusive.

The weight average molecular weight of the polyimide precursor is measured by gel permeation chromatography (GPC) under the following measurement conditions.

Column: TOSOH TSKgel α-M (7.8 mm I.D.×30 cm)
Eluent: DMF (dimethylformamide)/30 mM LiBr/60 mM phosphoric acid
Flow rate: 0.6 mL/min
Injection amount: 60 μL
Detector: RI (differential refractive index detector)

No particular limitation is imposed on the imidization temperature Ti° C. of the polyimide precursor used in the present exemplary embodiment. The imidization temperature is, for example, in the range of from 140° C. to 250° C. inclusive. From the viewpoint of maintaining the spherical shape of the particles, the imidization temperature is preferably in the range of from 150° C. to 240° C. inclusive and more preferably from 160° C. to 230° C. inclusive.

The imidization temperature Ti° C. of the polyimide precursor is determined as follows.

Specifically, the imidization temperature is judged from the amount of infrared absorption in the Fourier transform infrared spectrophotometry (FT-IR). The temperature at the maximum value of the amount of infrared absorption due to imide bonds at from 1490 cm$^{-1}$ to 1530 cm$^{-1}$ inclusive up to 300° C. is defined as the imidization temperature. When the temperature at the maximum absorption amount is, for example, 230° C., Ti° C. is 230° C.

The content of the polyimide precursor contained in the polyimide precursor solution according to the present exemplary embodiment may be from 0.1% by mass to 40% by mass inclusive and preferably from 1% by mass to 25% by mass inclusive based on the total mass of the polyimide precursor solution.

<Polyester Resin Particles>

The polyimide precursor solution according to the present exemplary embodiment contains the specific polyester resin particles. The specific polyester resin particles do not dissolve in the polyimide precursor solution but are dispersed therein. Moreover, the specific polyester resin particles can be removed in a particle removal step described later when a porous polyimide film is produced.

In the present specification, the phrase "the particles do not dissolve" is intended to encompass not only the case where the particles do not dissolve in a target liquid at 25° C. but also the case where the particles can dissolve in the target liquid in an amount of 3% by mass or less at 25° C.

The volume average particle diameter D50v of the specific polyester resin particles is from 3 μm to 50 μm inclusive, preferably from 10 μm to 50 μm inclusive, and more preferably from 20 μm to 40 μm inclusive.

When the volume average particle diameter of the specific polyester resin particles is in the above range, a porous polyimide film having high insulating properties may be obtained more easily than when the volume average particle diameter is below the above range, and a porous polyimide film having higher mechanical strength may be obtained more easily than when the volume average particle diameter is beyond the above range.

The volume average particle diameter of the polyester resin particles and their large-diameter side volume-based particle size distribution index (upper GSDv) described later are measured using a Coulter Multisizer II (manufactured by Beckman Coulter, Inc.) and an ISOTON-II (manufactured by Beckman Coulter, Inc.) as an electrolyte.

In the measurement, 0.5 mg or more and 50 mg or less of a measurement sample is added to 2 mL of a 5% aqueous solution of a surfactant (which may be sodium alkylbenzenesulfonate) serving as a dispersant. The mixture is added to 100 mL to 150 mL inclusive of the electrolyte.

The electrolyte with the sample suspended therein is subjected to dispersion treatment for 1 minute using an ultrasonic dispersion apparatus, and then the particle size distribution of particles having diameters within the range of from 2 μm to 60 μm inclusive is measured using an aperture having an aperture diameter of 100 μm in the Coulter Multisizer II. The number of particles sampled is 50000.

The particle size distribution measured and divided into different particle size ranges (channels) is used to obtain a volume-based cumulative distribution computed from the small diameter side. In the volume-based cumulative distribution, the particle diameter at a cumulative frequency of 50% is defined as a volume average particle diameter D50v, and the particle diameter at a cumulative frequency of 84% is defined as a volume-based particle diameter D84v.

These are used to compute the large-diameter side volume-based particle size distribution index (upper GSDv) as $(D84v/D50v)^{1/2}$.

The average circularity of the specific polyester resin particles is 0.970 or more, preferably from 0.975 to 0.995 inclusive, and more preferably from 0.980 to 0.990 inclusive.

When the average circularity of the specific polyester resin particles is in the above range, a porous polyimide film having high insulating properties may be obtained more easily than when the average circularity is below the above range, and the specific polyester resin particles themselves may be produced with greater ease than when the average circularity is beyond the above range.

The circularity of a polyester resin particle is determined as (the peripheral length of an equivalent circle of the polyester resin/the peripheral length of the polyester resin particle), i.e., [(the peripheral length of a circle having the same area as a projection image of the particle/the peripheral length of the projection image of the particle)]. Specifically, the average circularity is a value measured by the following method.

First, the polyester resin particles used for the measurement are collected by suction, and a flattened flow of the particles is formed. Particle images are captured as still images using flashes of light, and the average circularity is determined by subjecting the particle images to image analysis using a flow-type particle image analyzer (FPIA-3000 manufactured by SYSMEX Corporation). The number of sampled particles for the determination of the average circularity is 3500.

No particular limitation is imposed on the method for obtaining the polyester resin particles having a volume average particle diameter D50v in the above range and an average circularity in the above range. Such polyester resin particles can be obtained, for example, by an aggregation/coalescence method described later.

The large-diameter side volume-based particle size distribution index (hereinafter referred to also as the "upper GSDv") of the specific polyester resin particles is preferably 1.50 or less, more preferably from 1.10 to 1.40 inclusive, and still more preferably from 1.15 to 1.30 inclusive.

When the upper GSDv of the specific polyester resin particles is in the above range, a reduction in the film strength of the porous polyimide film to be obtained and a reduction in its insulating properties due to coarse powder may be smaller than those when the upper GSDv is beyond the above range. When the upper GSDv of the specific polyester resin particles is in the above range, the specific polyester resin particles themselves may be produced with greater ease than when the upper GSDv is below the above range.

The glass transition temperature Tg° C. of the specific polyester resin particles is preferably from 50° C. to 100° C. inclusive, more preferably from 70° C. to 98° C. inclusive, and still more preferably from 80° C. to 95° C. inclusive.

When the glass transition temperature Tg° C. of the specific polyester resin particles is in the above range, the shape of the pores in the porous polyimide film to be obtained may be more likely to be maintained during the formation of the porous polyimide film, and the pores may be less likely to collapse than when the glass transition temperature is below the above range. This easily allows the porous polyimide film obtained to have high insulating properties. When the glass transition temperature Tg° C. of the specific polyester resin particles is in the above range, the polyester resin particles may be formed into a spherical shape more easily than when the glass transition temperature Tg° C. is beyond the above range, so that the average circularity may easily fall within the above range.

The difference between the imidization temperature Ti° C. of the polyimide precursor contained in the polyimide precursor solution in the present exemplary embodiment and the glass transition temperature Tg° C. of the polyester resin particles, i.e., Ti° C.-Tg° C., is preferably from 70° C. to 150° C. inclusive, more preferably from 80° C. to 150° C. inclusive, and still more preferably from 100° C. to 150° C. inclusive.

When the value of Ti° C.-Tg° C. is in the above range, the shape of the pores in the porous polyimide film to be obtained may be more likely to be maintained during the formation of the porous polyimide film, and the pores may be less likely to collapse than when the value of Ti° C.-Tg° C. is below the above range. This easily allows the porous polyimide film obtained to have high insulating properties. When the value of Ti° C.-Tg° C. is in the above range, particle productivity and the storage stability of the varnish may be higher than when the value of Ti° C.-Tg° C. is below the above range.

The glass transition temperature is determined using a DSC curve obtained by differential scanning calorimetry (DSC). More specifically, the glass transition temperature is determined from "extrapolated glass transition onset temperature" described in a glass transition temperature determination method in "Testing methods for transition temperatures of plastics" in JIS K7121-1987.

The viscosity of a dispersion prepared by adding 30 parts by mass of the specific polyester resin particles to 100 parts by mass of water (i.e., the specific viscosity) at 25° C. is 10 mPa·s or less, preferably from 3 mPa·s to 10 mPa·s inclusive, and more preferably from 5 mPa·s to 10 mPa·s inclusive. When the specific viscosity is in the above range, a porous polyimide film having high insulating properties may be obtained more easily than when the specific viscosity is beyond the above range, and the movement of the particles may be limited as compared to that when the specific viscosity is below the above range, so that collisions between the particles may be prevented. In this case, aggregation of the particles may be more likely to be prevented.

The specific viscosity is measured using a rotational viscometer (product name: R/S Plus Rheometer manufactured by Brookfield, spindle: CP-75-1) in an environment at a temperature of 25° C. and a relative humidity of 55% under the condition of a shear rate of 100 rpm/s.

For example, any known polyester resin may be used as the polyester resin contained in the specific polyester resin particles.

The polyester resin is, for example, a polycondensation product of a polycarboxylic acid and a polyhydric alcohol. The polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (e.g., C1-C5 alkyl) esters thereof. In particular, the polycarboxylic acid may be, for example, an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (e.g., C1-C5 alkyl) esters thereof.

One polycarboxylic acid may be used alone, or two or more polycarboxylic acids may be used in combination.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol.

One polyhydric alcohol may be used alone, or two or more polyhydric alcohols may be used in combination.

In particular, the polyester resin contained in the specific polyester resin particles may be an aromatic polyester resin. When the aromatic polyester resin is used, the polyester resin particles obtained may have a higher glass transition temperature than when an aliphatic polyester resin is used. When the glass transition temperature of the specific polyester resin particles contained in the polyimide precursor solution is high, the shape of the pores in the porous polyimide film to be obtained may be more likely to be maintained during the formation of the porous polyimide film, and the pores may be less likely to collapse. This easily allows the porous polyimide film obtained to have high insulating properties. The specific polyester resin particles using the aromatic polyester resin may have a high affinity for the polyimide precursor, and the resin particles may be less likely to aggregate, so that a reduction in insulating properties due to segregation of the pores may be prevented.

The aromatic polyester resin may be any polyester resin having an aromatic ring. Specifically, it is only necessary that at least one of the polycarboxylic acid and the polyhydric alcohol serving as the monomers for the aromatic polyester resin have an aromatic ring. The aromatic polyester resin may be any of various polycondensation products including a polycondensation product of an aromatic polycarboxylic acid and an aromatic polyhydric alcohol, a polycondensation product of an aromatic polycarboxylic acid and an aliphatic polyhydric alcohol, and a polycondensation product of an aliphatic polycarboxylic acid and an aromatic polyhydric alcohol. In particular, the aromatic polyester resin may be a polycondensation product of an aromatic polycarboxylic acid and an aromatic polyhydric alcohol, from the viewpoint of obtaining a porous polyimide film having high insulating properties.

The number of aromatic rings per molecule of each of the aromatic polycarboxylic acid and the aromatic polyhydric alcohol may be from 1 to 2 inclusive. When the number of aromatic rings is in the above range, thermal decomposition of the specific polyester resin particles may be more easily occur in the production process of a porous polyimide film than when the number of aromatic rings is beyond the above range, so that a porous polyimide film having high insulating properties may be easily obtained.

The weight average molecular weight (Mw) of the polyester resin is preferably from 5000 to 1000000 inclusive and more preferably from 7000 to 500000 inclusive.

The number average molecular weight (Mn) of the polyester resin may be from 2000 to 100000 inclusive.

The molecular weight distribution Mw/Mn of the polyester resin is preferably from 1.5 to 100 inclusive and more preferably from 2 to 60 inclusive.

The weight average molecular weight and the number average molecular weight are measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

The polyester resin is obtained by a well-known production method. Specifically, for example, in one production method, the polymerization temperature is set to from 180° C. to 230° C. inclusive. If necessary, the pressure inside the reaction system is reduced, and the reaction is allowed to proceed while water and alcohol generated during condensation are removed.

When the raw material monomers do not dissolve in each other or are not compatible with each other at the reaction temperature, a high-boiling point solvent serving as a solubilizer may be added to dissolve the monomers. In this case, the polycondensation reaction is performed while the solubilizer is removed by evaporation. When a monomer with poor compatibility is present, the monomer with poor compatibility and an acid or alcohol to be polycondensed with the monomer are condensed in advance, and then the resulting polycondensation product and the main component are subjected to polycondensation.

The specific polyester resin particles may optionally contain additional components other than the polyester resin. Examples of the additional components include resins other than the polyester resin.

However, the content of the polyester resin based on the total mass of the specific polyester resin particles is preferably 80% by mass or more and more preferably 90% by mass or more.

(Method for Producing Oolyester Resin Particles)

The specific polyester resin particles may be produced by a dry production method (such as a kneading-grinding method) or by a wet production method (such as an aggregation/coalescence method, a suspension polymerization method, or a dissolution/suspension method). No particular limitation is imposed on the method for producing the specific polyester resin particles, and any known production method may be used.

In particular, from the viewpoint of adjusting the volume average particle diameter, average circularity, and specific viscosity of the polyester resin particles within the above ranges, the aggregation/coalescence method may be used to obtain the specific polyester resin particles.

Specifically, when the specific polyester resin particles are produced, for example, using the aggregation/coalescence method, the specific polyester resin particles are produced through: the step of preparing a resin particle dispersion containing polyester resin particles dispersed therein (a resin particle dispersion preparing step); the step of aggregating the polyester resin particles in the resin particle dispersion to form aggregated particles (an aggregated particle forming step); and the step of heating the aggregated particle dispersion with the aggregated particles dispersed therein to fuse and coalesce the aggregated particles to thereby form the specific polyester resin particles (a fusion/coalescence step).

—Resin Particle Dispersion Preparing Step—

First, the resin particle dispersion is prepared, for example, by dispersing the polyester resin particles in a dispersion medium using a surfactant.

Examples of the dispersion medium used for the resin particle dispersion include aqueous mediums.

Examples of the aqueous medium include: water such as distilled water and ion exchanged water; and alcohols. One of these aqueous mediums may be used alone, or two or more of them may be used in combination.

Examples of the surfactant include: anionic surfactants such as sulfate-based surfactants, sulfonate-based surfactants, phosphate-based surfactants, and soap-based surfactants; cationic surfactants such as amine salt-based surfactants and quaternary ammonium salt-based surfactants; and nonionic surfactants such as polyethylene glycol-based surfactants, alkylphenol ethylene oxide adduct-based surfactants, and polyhydric alcohol-based surfactants. Of these, an anionic surfactant or a cationic surfactant may be used. A nonionic surfactant may be used in combination with an anionic surfactant or a cationic surfactant.

One surfactant may be used alone, or two or more surfactants may be used in combination.

To disperse the polyester resin particles in the dispersion medium to prepare the resin particle dispersion, a commonly used dispersing method that uses, for example, a rotary shearing-type homogenizer, a ball mill using media, a sand mill, or a dyno-mill may be used.

The volume average particle diameter of the polyester resin particles dispersed in the resin particle dispersion is, for example, preferably from 0.01 µm to 1 µm inclusive, more preferably from 0.08 µm to 0.8 µm inclusive, and still more preferably from 0.1 µm to 0.6 µm inclusive.

The volume average particle diameter of the polyester resin particles is measured as follows. A particle size distribution measured using a laser diffraction particle size distribution measurement apparatus (e.g., LA-700 manufactured by HORIBA Ltd.) is used and divided into different particle size ranges (channels), and a cumulative volume distribution is computed from the small particle diameter side. The particle diameter at which the cumulative frequency is 50% relative to the total number of particles is measured as the volume average particle diameter D50v.

The content of the polyester resin particles contained in the resin particle dispersion is, for example, preferably from 5% by mass to 50% by mass inclusive and more preferably from 10% by mass to 40% by mass inclusive.

—Aggregated Particle Forming Step—

Next, the polyester resin particles are aggregated in the resin particle dispersion to form aggregated particles having diameters close to the target diameter of the specific polyester resin particles.

Specifically, for example, a flocculant is added to the resin particle dispersion, and the pH of the resin particle dispersion is adjusted to acidic (for example, a pH of from 2 to 5 inclusive). Then a dispersion stabilizer is optionally added, and the resulting mixture is heated to a temperature close to the glass transition temperature of the polyester resin particles (specifically, for example, a temperature from the glass transition temperature of the polyester resin particles $-30°$ C. to the glass transition temperature $-10°$ C. inclusive) to aggregate the particles dispersed in the resin particle dispersion to thereby form aggregated particles.

In the aggregated particle forming step, the flocculant may be added at room temperature (e.g., 25° C.) while the resin particle dispersion is agitated, for example, in a rotary shearing-type homogenizer. Then the pH of the resin particle dispersion may be adjusted to acidic (e.g., a pH of from 2 to 5 inclusive), and the dispersion stabilizer may be optionally added. Then the resulting mixture may be heated.

Examples of the flocculant include a surfactant with a polarity opposite to the polarity of the surfactant used as the dispersant added to the resin particle dispersion, inorganic metal salts, and divalent or higher polyvalent metal complexes.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

—Fusion/Coalescence Step—

Next, the aggregated particle dispersion with the aggregated particles dispersed therein is heated, for example, to a temperature equal to or higher than the glass transition temperature of the polyester resin particles (e.g., a temperature higher by 10° C. to 30° C. than the glass transition temperature of the polyester resin particles) to fuse and coalesce the aggregated particles to thereby form the specific polyester resin particles.

The specific polyester resin particles are obtained through the above-described steps.

In the present exemplary embodiment, from the viewpoint of obtaining a porous polyimide film having both high insulating properties and high mechanical strength simultaneously, the content of the specific polyester resin particles is preferably from 30% by mass to 80% by mass inclusive, more preferably from 40% by mass to 75% by mass inclusive, and still more preferably from 45% by mass to 70% by mass inclusive based on the total mass of the polyimide precursor and the specific polyester resin particles.

The content of the specific polyester resin particles is preferably from 0.1% by mass to 20% by mass inclusive, more preferably from 0.5% by mass to 20% by mass inclusive, and still more preferably from 1% by mass to 20% by mass inclusive based on the total mass of the polyimide precursor solution.

<Solvent>

The polyimide precursor solution in the present exemplary embodiment contains the solvent.

No particular limitation is imposed on the solvent so long as the polyimide precursor dissolves in the polyimide precursor solution and the specific polyester resin particles do not dissolve in the polyimide precursor solution but are dispersed therein.

The solvent may contain water.

Examples of the water include distilled water, ion exchanged water, ultrafiltrated water, and pure water.

The content of the water based on the total mass of the solvent is preferably from 50% by mass to 100% by mass inclusive, more preferably from 70% by mass to 100% by mass inclusive, and still more preferably from 80% by mass to 100% by mass inclusive.

Hereinafter, a solvent in which the content of water based on the total mass of the solvent is 50% by mass or more is referred to as a "water-based solvent," and a solvent in which the content of water based on the total mass of the solvent is less than 50% by mass and which contains an organic solvent is referred to as an "organic-based solvent."

—Water-Based Solvent—

The water-based solvent may contain a solvent other than water. Examples of the solvent other than water include water-soluble organic solvents and aprotic polar solvents. From the viewpoint of mechanical strength etc. of the porous polyimide film to be obtained, the solvent other than water may be a water-soluble organic solvent. The term "water-soluble material" means that the material can dissolve in water at 25° C. in an amount of 1% by mass or more.

When the solvent used is a water-based solvent containing a water-soluble organic solvent, the content of the water-soluble organic solvent based on the total mass of the water-based solvent is 40% by mass or less and preferably 30% by mass or less in order to prevent dissolution and swelling of the specific polyester resin particles in the polyimide precursor solution. To prevent dissolution and swelling of the specific polyester resin particles when a coating of the polyimide precursor solution is dried to form a coating film, the content of the water-soluble organic solvent is from 3% by mass to 50% by mass inclusive, preferably from 5% by mass to 40% by mass inclusive, and more preferably from 5% by mass to 35% by mass inclusive based on the total amount of the specific polyester resin particles and the polyimide precursor in the polyimide precursor solution.

Examples of the water-soluble organic solvent include a water-soluble ether-based solvent described below, a water-based ketone-based solvent described below, and a water-soluble alcohol-based solvent described below.

The water-soluble ether-based solvent is a water-soluble organic solvent having an ether bond in its molecule. Examples of the water-soluble ether-based solvent include tetrahydrofuran (THF), dioxane, trioxane, 1,2-dimethoxyethane, diethylene glycol dimethyl ether, and diethylene glycol diethyl ether. In particular, the water-soluble ether-based solvent may be tetrahydrofuran or dioxane.

The water-based ketone-based solvent is a water-soluble organic solvent having a ketone group in its molecule. Examples of the water-based ketone-based solvent include acetone, methyl ethyl ketone, and cyclohexanone. In particular, the water-based ketone-based solvent may be acetone.

The water-soluble alcohol-based solvent is a water-soluble organic solvent having an alcoholic hydroxy group in its molecule. Examples of the water-soluble alcohol-based solvent include methanol, ethanol, 1-propanol, 2-propanol, tert-butyl alcohol, ethylene glycol, monoalkyl ethers of ethylene glycol, propylene glycol, monoalkyl ethers of propylene glycol, diethylene glycol monoalkyl ethers of diethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. In particular, the water-soluble alcohol-based solvent may be methanol, ethanol, 2-propanol, ethylene glycol, a monoalkyl ether of ethylene glycol, propylene glycol, a monoalkyl ether of propylene glycol, diethylene glycol, or a monoalkyl ether of diethylene glycol.

From the viewpoint of improving various properties of the porous polyimide film to be obtained (e.g., transparency, mechanical strength, heat resistance, electric properties, solvent resistance, etc.), the water-based solvent may contain an aprotic polar solvent. In this case, to prevent dissolution and swelling of the specific polyester resin particles in the polyimide precursor solution, the content of the aprotic polar solvent is 40% by mass or less and preferably 30% by mass or less based on the total mass of the water-based solvent. To prevent dissolution and swelling of the specific polyester resin particles when the polyimide precursor solution is dried to form a coating film, the content of the aprotic polar solvent is from 3% by mass to 200% by mass inclusive, preferably from 3% by mass to 100% by mass inclusive, more preferably from 3% by mass to 50% by mass inclusive, and still more preferably from 5% by mass to 50% by mass inclusive, based on the total mass (solid contents) of the specific polyester resin particles and the polyimide precursor in the polyimide precursor solution.

One of the above aprotic polar solvents may be used alone, or two or more of them may be used in combination.

When the water-based solvent contains an aprotic polar solvent other than water, the aprotic polar solvent used in combination with water may be an organic solvent having a boiling point of from 150° C. to 300° C. inclusive and a dipole moment of from 3.0 D to 5.0 D inclusive. Specific examples of the aprotic polar solvent include N-methyl pyrrolidone (NMP), N,N-dimethylformamide (DMF), N,N-dimethylacetamide (DMAc), dimethyl sulfoxide (DMSO), hexamethylenephosphoramide (HMPA), N-methylcaprolactam, N-acetyl-2-pyrrolidone, 1,3-dimethyl-2-imidazolidinone (DMI), N,N☐-dimethylpropyleneurea, tetramethylurea, trimethyl phosphate, and triethyl phosphate.

When the water-based solvent contains a solvent other than water, the boiling point of the solvent used in combination with water may be 270° C. or lower, preferably from 60° C. to 250° C. inclusive, and more preferably from 80° C. to 230° C. inclusive. When the boiling point of the solvent used is in the above range, the solvent other than water is unlikely to remain in the polyimide film. This easily allows the polyimide film to be obtained to have high mechanical strength.

—Organic-Based Solvent—

The organic-based solvent is selected such that the polyimide precursor dissolves in the polyimide precursor solution but the specific polyester resin particles do not dissolve therein and are dispersed therein. The organic-based solvent may be a solvent mixture of a good solvent (S1) for the polyimide precursor and a solvent (S2) other than the good solvent (S1).

The good solvent (S1) for the polyimide precursor is a solvent in which the solubility of the polyimide precursor is 5% by mass or more. Specific examples of the good solvent (S1) include aprotic polar solvents such as N,N-dimethylformamide, N,N-dimethylacetamide, N-methylpyrrolidone, N-ethylpyrrolidone, tetramethylurea, 1,3-dimethyl-2-imidazolidinone, dimethylpropyleneurea, dimethyl sulfoxide, γ-butyrolactone, β-propiolactone, γ-valerolactone, δ-valerolactone, and γ-caprolactone.

Of these, N,N-dimethylacetamide, N-methylpyrrolidone, tetramethylurea, 1,3-dimethyl-2-imidazolidinone, dimethyl sulfoxide, and γ-butyrolactone are preferred, and N,N-dimethylacetamide, N-methylpyrrolidone, tetramethylurea, dimethyl sulfoxide, and γ-butyrolactone are more preferred. N,N-dimethylacetamide, N-methylpyrrolidone, and γ-butyrolactone are still more preferred.

The solvent (S2) other than the good solvent for the polyimide precursor is selected such that the solubility of the specific polyester resin particles in the solvent (S2) is low. In one example of a method for selecting the solvent, the specific polyester resin particles are added to candidate solvents, and a solvent that dissolves 3% by mass or less of the specific polyester resin particles is selected.

Examples of the solvent (S2) other than the good solvent for the polyimide precursor include: hydrocarbon-based solvents such as n-decane and toluene; alcohol-based solvents such as isopropyl alcohol, 1-propanol, 1-butanol, 1-pentanol, and phenethyl alcohol; glycol-bases solvents such as ethylene glycol, propylene glycol, ethylene glycol monomethyl ether, 1-methoxy-2-propanol, diethylene glycol monomethyl ether, and triethylene glycol monomethyl ether; ether-based solvents such as diglyme, triglyme, tetraglyme, and methyl cellosolve acetate; and phenol-based solvents such as phenol and cresol.

The polarity of the solvent (S1) is generally high. When the solvent (S1) is used alone, the solvent (S1) may dissolve not only the polyimide precursor but also the specific polyester resin particles. Therefore, the mixing ratio of the solvent (S1) to the solvent (S2) may be determined such that the polyimide precursor dissolves in the mixture and the specific polyester resin particles do not dissolve therein. To prevent, for example, the shape deformation of the pores caused by dissolution of the specific polyester resin particles during heating of the coating of the polyimide precursor solution, the boiling point of the solvent (S2) is higher than the boiling point of the solvent (S1) by preferably at least 10° C. and more preferably at least 20° C.

<Organic Amine Compound>

When the solvent contains water, the polyimide precursor solution may optionally contain an organic amine compound in order to dissolve the polyimide precursor in the solvent. In particular, when the solvent is the water-based solvent, the polyimide precursor solution may contain an organic amine compound. When the polyimide precursor solution contains the organic amine compound, the polyimide precursor becomes water-soluble. The organic amine compound is a compound that forms an amine salt with a carboxy group in the polyimide precursor to increase its solubility in the solvent containing water and also functions as an imidization promoter. Therefore, when the solvent used contains water and the polyimide precursor solution contains the organic amine compound, a porous polyimide film having high mechanical strength may be easily obtained.

Specifically, the organic amine compound may be an amine compound having a molecular weight of 170 or less. The organic amine compound may be a compound other than the diamine compound used as a raw material of the polyimide precursor.

The organic amine compound may be a water-soluble compound. The term "water-soluble material" means that the material can dissolve in water at 25° C. in an amount of 1% by mass or more.

Examples of the organic amine compound include primary amine compounds, secondary amine compounds, and tertiary amine compounds.

In particular, the organic amine compound is preferably at least one selected from the group consisting of secondary amine compounds and tertiary amine compounds and is more preferably a tertiary amine compound. When the organic amine compound used is at least one selected from the group consisting of secondary amine compounds and tertiary amine compounds, the solubility of the polyimide precursor in the solvent may increase, and film formability may be improved. Moreover, the storage stability of the polyimide precursor solution may increase.

Examples of the organic amine compound include, in addition to the monovalent amine compounds, divalent and higher polyvalent amine compounds. When a divalent or higher polyvalent amine compound is used, a pseudo-cross-linked structure may be easily formed between molecules of the polyimide precursor, and the storage stability of the polyimide precursor solution may be improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino)ethanol, 2-(ethylamino)ethanol, and morpholine.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, and 2-ethyl-4-methylimidazole.

From the viewpoint of the pot life of the polyimide precursor solution and the uniformity in film thickness, a tertiary amine compound is preferable. From this point of view, the organic amine compound is more preferably at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine. The organic amine compound is most preferably at least one selected from the group consisting of 2-dimethylaminoethanol, 2-diethylaminoethanol, 2-dimethylaminopropanol, triethylamine, N-methylmorpholine, N-ethylmorpholine, 1,2-dimethylimidazole, 2-ethyl-4-methylimidazole, N-methylpiperidine, and N-ethylpiperidine.

From the viewpoint of film formability, the organic amine compound may also be an amine compound (particularly a tertiary amine compound) having a nitrogen-containing heterocyclic structure. Examples of the amine compound having a nitrogen-containing heterocyclic structure (hereinafter referred to as a "nitrogen-containing heterocyclic amine compound") include isoquinolines (amine compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyanilines, polypyridines, and polyamines.

From the viewpoint of film formability, the nitrogen-containing heterocyclic amine compound is preferably at least one selected from the group consisting of morpholines, pyridines, piperidines, and imidazoles and more preferably a morpholine (an amine compound having a morpholine skeleton). Of these, at least one selected from the group consisting of N-methylmorpholine, N-methylpiperidine, pyridine, 1,2-dimethylimidazole, 2-ethyl-4-methylimidazole, and picoline is more preferred, and N-methylmorpholine is still more preferred.

In particular, the organic amine compound may be a compound having a boiling point of 60° C. or higher (preferably from 60° C. to 200° C. inclusive and more preferably from 70° C. to 150° C. inclusive). When the boiling point of the organic amine compound is 60° C. or higher, volatilization of the organic amine compound from the polyimide precursor solution during storage may be prevented, and deterioration in the solubility of the polyimide precursor in the solvent may be prevented.

The content of the organic amine compound may be from 50% by mole to 500% by mole inclusive and is preferably from 80% by mole to 250% by mole inclusive and more preferably from 90% by mole to 200% by mole inclusive based on the amount of carboxy groups (—COOH) in the polyimide precursor in the polyimide precursor solution.

When the content of the organic amine compound is in the above range, the solubility of the polyimide precursor in the solvent may increase, and film formability may be improved. Moreover, the storage stability of the polyimide precursor solution may be improved.

One of the above organic amine compounds may be used alone, or two or more of them may be used in combination.
<Additional Additives>

The polyimide precursor solution according to the present exemplary embodiment may contain a catalyst for promoting the imidization reaction and a leveling agent for improving the quality of a film product.

The catalyst for promoting the imidization reaction may be a dehydrator such as an acid anhydride or an acid catalyst such as a phenol derivative, a sulfonic acid derivative, or a benzoic acid derivative.

For example, the polyimide precursor solution may further contain an electrically conductive material for imparting electrical conductivity. The electrically conductive material may be a material exhibiting electrical conductivity (e.g., a volume resistivity of less than $10^7$ Ω·cm) or may be a semiconductive material (e.g., a volume resistivity of from $10^7$ Ω·cm to $10^{13}$ Ω·cm inclusive).

Examples of the electrically conductive material include: carbon black (such as acidic carbon black having a pH of 5.0 or less); metals (such as aluminum and nickel); metal oxides (such as yttrium oxide and tin oxide); and ion conductive materials (such as potassium titanate and LiCl). One of these electrically conductive materials may be used alone, or two or more of them may be used in combination.

The polyimide precursor solution according to the present exemplary embodiment may contain $LiCoO_2$, $LiMn_2O$, etc. used for electrodes of lithium ion batteries.
<Method for Producing Polyimide Precursor Solution>

Examples of a method for producing the polyimide precursor solution according to the present exemplary embodiment include the following method (i) and the following method (ii).

(i) A method including producing a solution containing the polyimide precursor and then adding the specific polyester resin particles thereto.

(ii) A method including producing a particle dispersion and synthesizing the polyimide precursor in the dispersion.

In particular, from the viewpoint of improving the dispersibility of the specific polyester resin particles, the method (ii) may be used as the method for producing the polyimide precursor solution according to the present exemplary embodiment.

(i) Method Including Producing Solution of Polyimide Precursor and Then Adding Specific Polyester Resin Particles First, the solution of the polyimide precursor without the particles dispersed therein is obtained using any known method. Specifically, for example, the tetracarboxylic dianhydride and the diamine compound are polymerized in a solvent to produce the polyimide precursor, and the solution of the polyimide precursor is thereby obtained.

When the solvent used is a water-based solvent, the polymerization may be performed in the presence of an organic amine to obtain the solution of the polyimide precursor. In another example, the tetracarboxylic dianhydride and the diamine compound are polymerized in an organic solvent such as an aprotic polar solvent (e.g., N-methylpyrrolidone (NMP)) to produce the polyimide precursor, and the resulting mixture is added to the water-based solvent to precipitate the polyimide precursor. Then the polyimide precursor and the organic amine compound are dissolved in the water-based solvent to thereby obtain the solution of the polyimide precursor.

Next, the specific polyester resin particles are added to the obtained solution of the polyimide precursor.

(ii) Method Including Producing Particle Dispersion and Then Synthesizing Polyimide Precursor in Dispersion When an organic-based solvent is used as the solvent for the polyimide precursor solution, first, a dispersion containing the specific polyester resin particles dispersed in a solvent that does not dissolve the particles but dissolves the polyimide precursor is prepared. Next, the tetracarboxylic dianhydride and the diamine compound are polymerized in the dispersion to produce the polyimide precursor, and a polyimide precursor solution containing the specific polyester resin particles dispersed therein is thereby obtained.

When a water-based solvent is used as the solvent for the polyimide precursor solution, first, a water-based solvent dispersion of the specific polyester resin particles is prepared. Next, the tetracarboxylic dianhydride and the diamine compound are polymerized in the dispersion in the presence of an organic amine to produce the polyimide precursor, and a polyimide precursor solution containing the specific polyester resin particles dispersed therein is thereby obtained.
[Porous Polyimide Film]

A porous polyimide film according to an exemplary embodiment is a porous sintered product obtained from the above polyimide precursor solution and having pores. The porous polyimide film according to the present exemplary embodiment contains an imidization product of the polyimide precursor contained in the polyimide precursor solution.
<Method for Producing Porous Polyimide Film>

The porous polyimide film according to the present exemplary embodiment is obtained by the following production method.

The porous polyimide film production method according to the present exemplary embodiment includes: applying the polyimide precursor solution to a substrate to thereby form a coating (step (P-1)); drying the coating to thereby form a dried film (step (P-2)); and firing the dried film to imidize the polyimide precursor contained in the dried film and remove the polyester resin particles to thereby form a porous polyimide film (step (P-3)).

A preferred example of the porous polyimide film production method according to the present exemplary embodiment will be described with reference to the drawing.

FIG. 1 is a schematic illustration showing the structure of the porous polyimide film obtained by the porous polyimide film production method according to the present exemplary embodiment.

In FIG. 1, 31 represents the substrate, 10A represents pores, and 10 represents the porous polyimide film.

—Step (P-1)—

In step (P-1), first, the polyimide precursor solution described above is prepared. Next, the polyimide precursor solution is applied to the substrate to form a coating.

To form the coating, the polyimide precursor solution obtained by any of the above-described methods is applied to the substrate. The coating obtained contains at least the polyimide precursor, the specific polyester resin particles, and the solvent.

The substrate to which the polyimide precursor solution is applied (the substrate 31 in FIG. 1) is selected according to the application of the porous polyimide film to be obtained. When the porous polyimide film is used alone, a polyimide film forming substrate may be used as the substrate. When the porous polyimide film is used as a coating film that coats the surface of a component, the component itself may be used as the substrate.

Examples of the polyimide film forming substrate include: resin substrates such as polystyrene substrates and polyethylene terephthalate substrates; glass substrates; ceramic substrates; metal substrates such as iron substrates and stainless steel (SUS) substrates; and composite material substrates formed of combinations of the above materials.

The polyimide film forming substrate may be optionally subjected to release treatment using, for example, a release agent such as a silicone-based or fluorine-based release agent to form a release layer. The surface of the polyimide film forming substrate may be roughened to about the size of the particles. This is effective because exposure of the particle at the contact surface of the substrate is facilitated.

When the porous polyimide film is used as a coating film that coats the surface of a component, specific examples of the component used as the substate include: a wire body of an insulated wire described later; various substrates used for liquid crystal elements; semiconductor substrates on which integrated circuits are formed; wiring substrates on which wiring lines are formed; and substrates of printed circuit boards on which electric components and wiring lines are formed.

No particular limitation is imposed on the method for applying the polyimide precursor solution to the substrate. Examples of the method include various methods such as a spray coating method, a spin coating method, a roll coating method, a bar coating method, a slit-die coating method, and an inkjet coating method.

The application amount of the polyimide precursor solution may be set such that a prescribed film thickness is obtained.

—Step (P-2)—

In step (P-2), the coating formed in step (P-1) is dried to form a dried film containing the polyimide precursor and the specific polyester resin particles.

No particular limitation is imposed on the method for drying the coating formed on the substrate, and examples of the method include various methods such as heat drying, air drying, and vacuum drying. More specifically, the coating may be dried to form the dried film such that the amount of the solvent remaining in the dried film is 50% by mass or less (preferably 30% by mass or less) based on the mass of solids in the dried film.

—Step (P-3)—

In step (P-3), the dried film formed in step (P-2) is fired to imidize the polyimide precursor contained in the dried film and remove the specific polyester resin particles to thereby form a porous polyimide film.

As the imidization proceeds and the imidization ratio increases, the polyimide film becomes more and more difficult to dissolve in the solvent. When the specific polyester resin particles are removed, the regions that were occupied by the particles become pores (pores 10A in FIG. 1), and the porous polyimide film (the porous polyimide film 10 in FIG. 1) is thereby obtained.

The firing temperature of the dried film is, for example, in the range of from 150° C. to 320° C. inclusive, preferably from 180° C. to 300° C. inclusive, and more preferably from 200° C. to 280° C. inclusive.

The dried film may be fired by heating it in two of more stages. Specifically, for example, the following heating conditions are used.

The heating conditions in the first stage are as follows. The heating temperature in the first stage may be set such that the shape of the specific polyester resin particles is maintained. The heating temperature may be in the range of from 50° C. to 150° C. inclusive and is preferably in the range of from 60° C. to 140° C. inclusive. The heating time in the first stage may be in the range of from 10 minutes to 60 minutes inclusive. The higher the heating temperature in the first stage, the shorter the heating time in the first stage.

The heating conditions in the second stage may be, for example, a temperature of from 150° C. to 450° C. inclusive (preferably from 200° C. to 400° C. inclusive) for from 20 minutes to 120 minutes inclusive. When the heating conditions are in the above ranges, the imidization reaction further proceeds. During the heating reaction, the temperature may be increased stepwise or gradually at a constant rate before the temperature reaches the final heating temperature.

The heating conditions are not limited to those in the two-stage heating method described above, and a single-stage heating method, for example, may be used. In the single-stage heating method, the imidization may be completed, for example, only under the heating conditions in the second stage described above.

When the porous polyimide film is used alone, the polyimide film forming substrate used in the first step may be removed in the second step when the coating is dried and the dried film is obtained, when the polyimide precursor in the polyimide film becomes difficult to dissolve in the organic solvent, or when the imidization in the film is completed.

The porous polyimide film is obtained through the above steps. The porous polyimide film may be further processed according to its intended application.

The polyimide precursor solution used in the present exemplary embodiment may be subjected to defoaming treatment before the coating of the polyimide precursor solution is formed. The defoaming treatment may be performed because the occurrence of defects in the porous polyimide film obtained is reduced as compared to that when the defoaming treatment is not performed.

No particular limitation is imposed on the defoaming treatment method, and the defoaming treatment may be performed under reduced pressure (vacuum defoaming) or may be performed under normal pressure. When the defoaming treatment is performed under normal pressure, the defoaming treatment may be performed while, for example, centrifugal force is applied by rotation or revolution. Even when the defoaming is performed under either reduced pressure or normal pressure, the defoaming treatment may be performed under stirring, heating, etc. as needed. The defoaming treatment may be performed under reduced pressure because the treatment can be performed easily and the defoaming ability is high. The conditions for the defoaming treatment may be set according to the amount of remaining pores.

<Properties of Porous Polyimide Film>
(Pores)

No particular limitation is imposed on the porosity of the porous polyimide film. The porosity is preferably from 30% by volume to 80% by volume inclusive, more preferably from 40% by volume to 78% by volume inclusive, still more preferably from 45% by volume to 74% by volume inclusive, and yet more preferably from 50% by volume to 70% by volume inclusive. When the porosity of the porous polyimide film is in the above range, the insulating properties of the porous polyimide film may be higher than when the porosity is below the above range, and the mechanical strength of the porous polyimide film may be higher than when the porosity is beyond the above range.

The porosity of the porous polyimide film is determined from its apparent density and true density.

The apparent density d is a value obtained by dividing the mass (g) of the porous polyimide film by the volume ($cm^3$) of the porous polyimide film including the pores. The apparent density d may be determined by dividing the mass per unit area ($g/m^2$) of the porous polyimide film by the thickness (μm) of the porous polyimide film.

The true density ρ is a value obtained by dividing the mass (g) of the porous polyimide film by the volume ($cm^3$) of the porous polyimide film excluding the volume of the pores (i.e., the volume of only the resin skeleton).

The porosity of the porous polyimide film is computed using the following formula (II).

Porosity (% by volume)=$\{1-(d/\rho)\} \times 100 = [1-\{(w/t)/\rho)\}] \times 100$   Formula (II)

d: Apparent density of the porous polyimide film ($g/cm^3$)
ρ: True density of the porous polyimide film ($g/cm^3$)
w: Mass per unit area of the porous polyimide film (g/m2)
t: Thickness of the porous polyimide film (μm)

The volume average diameter of the pores is preferably from 3 μm to 50 μm inclusive, more preferably from 10 μm to 50 μm inclusive, and still more preferably from 20 μm to 40 μm inclusive.

When the volume average diameter of the pores is in the above range, the insulating properties of the porous polyimide film may be higher than when the volume average diameter is below the above range, and the mechanical strength may be higher than when the volume average diameter is beyond the above range.

The average circularity of the pores is preferably 0.970 or more, more preferably from 0.97 to 0.995 inclusive, and still more preferably from 0.98 to 0.99 inclusive.

When the average circularity of the pores is in the above range, the insulating properties of the porous polyimide film are higher than when the average circularity is below the above range. It is difficult to obtain a porous polyimide film in which the average circularity of the pores is beyond the above range.

The volume average diameter of the pores and their average circularity are values obtained by observation and measurement using a scanning electron microscope (SEM). Specifically, first, the porous polyimide film is cut in the thickness direction to prepare a measurement sample whose cross section serves as a measurement surface. Then the measurement sample is observed using a VE SEM manufactured by KEYENCE CORPORATION and subjected to measurement using image processing software provided as standard software of the SEM. The observation and measurement are performed for 100 pore portions in the cross section of the measurement sample. The pore diameter distribution is determined, and the volume average of the pore diameters is determined to thereby determine the volume average diameter of the pores. When the shape of the pores is not circular, the lengths of the longest portions of the pores are used as pore diameters. The value of (the circle-equivalent perimeter)/(the perimeter) of each pore is computed, and a value obtained by averaging the computed values is used as the average circularity of the pores.

(Remaining ratio of particle decomposition products)

Decomposition products of the resin particles contained in the polyimide precursor solution remain in the porous polyimide film. From the viewpoint of obtaining high insulating properties, the amount of the decomposition products (hereinafter referred to also as the "remaining ratio of the particle decomposition products") is preferably 10% by mass or less, more preferably 5% by mass or less, and still more preferably 1% by mass or less based on the total mass of the porous polyimide film.

The remaining ratio of the particle decomposition products in the porous polyimide film is determined as follows.

Specifically, the porous polyimide film is heated from room temperature (25° C.) to 400° C. at 10° C./minute using an STA7200 manufactured by Hitachi High-Tech Science Corporation, and then the remaining ratio after the porous polyimide film is maintained at 400° C. for 60 minutes is computed using the results of thermogravimetry (TG) measurement. Specifically, the mass of the porous polyimide film before heating is denoted by $W_1$, and the mass of the porous polyimide film heated to 400° C. and maintained for 60 minutes is denoted by $W_2$. Then the remaining ratio is represented by the following formula.

Formula: Remaining ratio (% by mass)=$(W_1-W_2)/W_2 \times 100$ (Film thickness)

No particular limitation is imposed on the average thickness of the porous polyimide film, and the average thickness may be selected according to its intended application.

The average thickness of the porous polyimide film may be, for example, from 10 μm to 1000 μm inclusive. The average thickness of the porous polyimide film may be 20 μm or more and may be 30 μm or more. The average thickness of the porous polyimide film may be 500 μm or less and may be 400 μm or less.

For example, when the porous polyimide film is used as an insulating coating that is a coating film of an insulated wire described later, the average thickness of the porous polyimide film is preferably from 10 μm to 500 μm inclusive, more preferably from 50 μm to 400 μm inclusive, and still more preferably from 100 μm to 300 μm inclusive, from the viewpoint of the strength of the film.

The average thickness of the porous polyimide film is determined as follows. The thickness of the porous polyimide film is measured at five points using an eddy current coating thickness meter CTR-1500E manufactured by SANKO ELECTRONIC LABORATORY CO., LTD., and the arithmetic mean of the measurements is computed.

(Dielectric Constant)

No particular limitation is imposed on the relative dielectric constant of the porous polyimide film at 1 kHz. For example, when the porous polyimide film is used as the insulating coating that is the coating film of the insulated wire described later, the relative dielectric constant of the porous polyimide at 1 kHz is preferably 5 or less, more preferably 3 or less, and still more preferably 2 or less, from the viewpoint of increasing the corona discharge start voltage of the wire. No particular limitation is imposed on the lower limit of the relative dielectric constant. However, the relative dielectric constant may be larger than 1, which is the relative dielectric constant of air.

The relative dielectric constant at 1 kHz is measured as follows. An LCR meter (ZM2353 manufactured by NF Corporation) is used to measure the electrostatic capacitance of the porous polyimide film when an AC electric field of 1 V and 1 kHz is applied to the porous polyimide film, and the relative dielectric constant is computed from the results of the measurement using a formula below. In the formula below, $\varepsilon_r$ is the relative dielectric constant, and $\varepsilon$ is the dielectric constant. C is the electrostatic capacitance, and l is the thickness. A is the area of electrodes during the measurement of the electrostatic capacitance, and $\varepsilon_0$ is the dielectric constant of a vacuum.

$$\varepsilon_r = \frac{\varepsilon}{\varepsilon_0} = \frac{Cl}{A\varepsilon_0}$$

<Applications of Porous Polyimide Film>

Examples of the applications of the porous polyimide film include: insulating coatings used as coating films of insulated wires described later; cell separators of lithium batteries etc.; separators for electrolytic capacitors; electrolyte films for fuel cells etc.; electrode materials for batteries; separation membranes for gas or liquid; low-dielectric constant materials; and filtration films.

[Insulated Wire]

An insulated wire according to an exemplary embodiment includes a wire body and the above-described porous polyimide film disposed on the surface of the wire body. In the insulated wire according to the present exemplary embodiment, the above-described porous polyimide film is used as an insulating coating that is a coating film coating the wire body.

Examples of the wire body include wires, rods, and plates made of metals and alloys such as annealed copper, hard-drawn copper, oxygen-free copper, chromium ore, aluminum, silver, and copper alloys. The wire body may be a stranded wire produced by twisting a plurality of wires.

No particular limitation is imposed on the thickness of the wire body, and the thickness may be, for example, in the range of from 2 mm to 200 mm inclusive. The thickness of the wire body is its major axis in a cross section perpendicular to the longitudinal direction of the wire body.

The porous polyimide film is disposed, for example, so as to surround the outer circumferential surface of the wire body. The porous polyimide film may cover the entire outer circumferential surface of the wire body or may cover part of the outer circumferential surface of the wire body.

The porous polyimide film may be disposed in contact with the surface of the wire body or may be disposed thereon with an additional layer therebetween. The additional layer that may be disposed between the wire body and the porous polyimide film is, for example, a vinyl coating layer.

An additional layer may be disposed on the outer circumferential surface of the porous polyimide film. The additional layer that may be disposed on the outer circumferential surface of the porous polyimide film may be, for example, a sheath (outer protective coating).

The porous polyimide film used as the insulating coating may be formed by applying the above-described polyimide precursor solution to the outer circumferential surface of the wire body, drying the polyimide precursor solution, imidizing the polyimide precursor, and removing the particles. Alternatively, the insulating coating may be formed as follows. A dried film obtained by applying the polyimide precursor solution to the surface of the polyimide film forming substrate and drying the polyimide precursor solution, a polyimide film obtained by firing the dried film to imidize the polyimide precursor, or a polyimide film obtained by firing the dried film to imidize the polyimide precursor and remove the particles is peeled off from the polyimide film forming substrate, placed on the outer circumferential surface of the wire body, and optionally subjected to heating etc.

EXAMPLES

Examples will next be described. However, the present disclosure is not limited to these Examples. In the following description, "parts" and "%" are based on mass, unless otherwise specified.

[Preparation of Resin Particle Dispersions]

—Resin Particle Dispersion (B1)—

<Production of Polyester Resin Particle Aqueous Dispersion>

(Production of Polyester Resin Aqueous Dispersion)

Ethylene glycol: 50 parts
Neopentyl glycol: 42 parts
1,9-Nonanediol: 32 parts
Terephthalic acid: 96 parts The above materials are placed in a flask and heated to a temperature of 200° C. over 1 hour. After confirmation that the reaction system has been uniformly stirred, 1.2 parts of dibutyl tin oxide is added. While water produced is removed by evaporation, the temperature is increased to 240° C. over 6 hours, and the stirring is continued at 240° C. for 4 hours to thereby obtain an amorphous polyester resin (acid value: 9.8 mgKOH/g, weight average molecular weight: 23000, glass transition temperature: 80° C.). The amorphous polyester resin in a molten state is transferred to an emulsifying-dispersing apparatus (CAVITRON CD1010, EUROTEC Co., Ltd.) at a rate of 100 g/minute. Separately, diluted ammonia water prepared by diluting reagent ammonia water with ion exchanged water to a concentration of 0.37% by mass is placed in a tank. While heated to 120° C. using a heat exchanger, the diluted ammonia water, together with the amorphous polyester resin, is transferred to the emulsifying-dispersing apparatus at a rate of 0.1 L/minute. The emulsifying-dispersing apparatus is operated under the following conditions: rotor rotation speed: 60 Hz; and pressure: 5 kg/cm². An amorphous polyester resin dispersion (A1) with a volume average particle diameter of 155 nm and a solid content of 20% by mass is thereby obtained.

(Production of Polyester Resin Particles)

Amorphous polyester resin dispersion (A1): 500 parts
Polyaluminum chloride: 0.4 parts
Ion exchanged water: 167 parts The above materials are placed in a stainless steel-made round flask, mixed and dispersed sufficiently using a homogenizer (ULTRA-TURRAX T50, IKA), and then heated to 80° C. in an oil bath for heating while the mixture in the flask is stirred. Then the mixture in the reaction system is held at 80° C. for 120 minutes. Next, a 0.5 mol/L aqueous sodium hydroxide solution is used to adjust the pH to 8.0. The flask is hermetically sealed, and a stirring shaft is magnetically sealed. While the stirring is continued, the resulting mixture is heated to 90° C. and held for 30 minutes. Next, the mixture is cooled at a cooling rate of 5° C./minute, subjected to solid-liquid separation, and washed sufficiently with ion exchanged water. Then the mixture is subjected to solid-liquid separation, re-dispersed in ion exchanged water at 30° C., and stirred at a rotation speed of 300 rpm for 15 minutes for washing. This washing procedure is repeated another 6 times. When the pH of the filtrate reaches 7.5 and its electric conductivity reaches 7 μS/cm, the mixture is subjected to solid-liquid separation, and vacuum drying is performed for 24 hours to thereby obtain specific polyester resin particles (B1) that are polyester resin particles having a volume average particle diameter of 25 μm and an average circularity of 0.990.

(Production of Polyester Resin Particle Aqueous Dispersion)

100 Parts of the specific polyester resin particles (B1) obtained as described above, 232 parts of ion exchanged water, and 2 parts of an anionic dispersant (Neogen S.C., DAI-ICHI KOGYO SEIYAKU Co., Ltd.) are placed in a beaker and subjected to ultrasonic treatment for 30 minutes to thereby obtain a resin particle dispersion (B1), which is a polyester resin particle aqueous dispersion.

The resin particle dispersion (B1) containing the specific polyester resin particles (B1) dispersed therein is obtained in the manner described above. The weight average molecular weight of the specific polyester resin particles (B1) is 23000, and the solid concentration of the resin particle dispersion (B1) is 30% by mass. The glass transition temperature Tg° C., volume average particle diameter D50v, average circularity, upper GSDv, and specific viscosity of the specific polyester resin particles (B1) are measured using the methods described above and shown in Table 1.

—Resin Particle Dispersion (B2)—

A resin particle dispersion (B2) containing specific polyester resin particles (B2) dispersed therein is obtained in the same manner as in the production of the resin particle dispersion (B1) except that, when the polyester resin aqueous dispersion is produced, the amount of ethylene glycol added is changed from 50 parts to 56 parts and that the amount of 1,9-nonanediol added is changed from 32 parts to 16 parts. The weight average molecular weight of the specific polyester resin particles (B2) is 26000, and the solid concentration of the resin particle dispersion (B2) is 30% by mass. The glass transition temperature Tg° C., volume average particle diameter D50v, average circularity, upper GSDv, and specific viscosity of the specific polyester resin particles (B2) are measured using the methods described above and shown in Table 1.

—Resin Particle Dispersion (B3)—

A resin particle dispersion (B3) containing specific polyester resin particles (B3) dispersed therein is obtained in the same manner as in the production of the resin particle dispersion (B1) except that, when the polyester resin particles are produced, the mixture in the reaction system is held at 80° C. for 240 minutes instead of at 80° C. for 120 minutes. The weight average molecular weight of the specific polyester resin particles (B3) is 24000, and the solid concentration of the resin particle dispersion (B3) is 30% by mass. The glass transition temperature Tg° C., volume average particle diameter D50v, average circularity, upper GSDv, and specific viscosity of the specific polyester resin particles (B3) are measured using the methods described above and shown in Table 1.

—Resin Particle Dispersion (C1)—

A resin particle dispersion (C1) containing comparative polyester resin particles (C1) dispersed therein is obtained in the same manner as in the production of the resin particle dispersion (B1) except that, when the polyester resin aqueous dispersion is produced, the amount of ethylene glycol added is changed from 50 parts to 31 parts, that the amount of neopentyl glycol added is changed from 42 parts to 65 parts, and that the amount of 1,9-nonanediol added is changed from 32 parts to 48 parts. The weight average molecular weight of the comparative polyester resin particles (C1) is 30000, and the solid concentration of the resin particle dispersion (C1) is 30% by mass. The glass transition temperature Tg° C., volume average particle diameter D50v, average circularity, upper GSDv, and specific viscosity of the comparative polyester resin particles (C1) are measured using the methods described above and shown in Table 1.

—Resin Particle Dispersion (C2)—

A resin particle dispersion (C2) containing comparative polyester resin particles (C2) dispersed therein is obtained in the same manner as in the production of the resin particle dispersion (B1) except that, when the polyester resin particles are produced, the mixture is heated to 45° C. in the oil bath for heating instead of to 80° C. in the oil bath for heating. The weight average molecular weight of the comparative polyester resin particles (C2) is 23000, and the solid concentration of the resin particle dispersion (C2) is 30% by mass. The glass transition temperature Tg° C., volume average particle diameter D50v, average circularity, upper GSDv, and specific viscosity of the comparative polyester resin particles (C2) are measured using the methods described above and shown in Table 1.

—Resin Particle Dispersion (C3)—

Styrene: 489 parts
n-Butyl acrylate: 63 parts
Acrylic acid: 12 parts
Dodecanethiol: 15 parts The above components are mixed and dissolved to prepare a monomer solution.

Separately, 14 parts by mass of an anionic surfactant (Dowfax manufactured by the Dow Chemical Company) is dissolved in 250 parts by mass of ion exchanged water. The monomer solution is added dropwise to the mixture over 10 minutes using a T.K. HOMOGENIZING MIXER MARK II (manufactured by Tokushu Kika Kogyo Co., Ltd.) to perform O/W (oil in water) emulsification in a flask. Then, while the temperature is held at 40° C. or lower, the mixture is subjected to emulsification and dispersion to thereby obtain a monomer emulsion A.

1 Part by mass of the anionic surfactant (Dowfax manufactured by the Dow Chemical Company) is dissolved in 555 parts by mass of ion exchanged water, and the mixture is placed in a polymerization flask.

The polymerization flask is hermetically sealed, and a reflux tube is installed. While nitrogen is introduced, the polymerization flask is gradually heated to 75° C. in a water bath under gentle stirring and held at 75° C.

9 Parts by mass of ammonium persulfate is dissolved in 43 parts by mass of ion exchanged water, and the mixture is added dropwise to the polymerization flask over 20 minutes using a metering pump. Then the monomer emulsion A is added dropwise over 200 minutes using a metering pump.

Then the polymerization flask is held at 75° C. for 3 hours under gentle stirring to complete the polymerization. Then the flask is cooled to obtain a resin particle dispersion (C3) containing styrene acrylic resin particles (C3) dispersed therein. The weight average molecular weight of the styrene acrylic resin particles (C3) is 19000, and the solid concentration of the resin particle dispersion (C3) is 41% by mass. The glass transition temperature Tg° C., volume average particle diameter D50v, average circularity, upper GSDv, and specific viscosity of the styrene acrylic resin particles (C3) are measured using the methods described above and shown in Table 1.

—Resin Particle Dispersion (C4)—

A resin particle dispersion (C4) is obtained in the same manner as in the production of the resin particle dispersion (C3) except that the amount of styrene added is changed from 489 parts to 570 parts and that the amount of n-butyl acrylate added is changed from 63 parts to 35 parts. The weight average molecular weight of the styrene acrylic resin is 20000, and its glass transition temperature Tg° C. is 80° C. In the resin particle dispersion (C4), coalescence of the styrene acrylic resin particles is not completed, and the average circularity of the aggregated particles is small.

TABLE 1

| Dispersion | Type of resin | Tg (° C.) | D50v (μm) | Circularity | Upper GSDv | Specific viscosity (mPa · s) |
|---|---|---|---|---|---|---|
| B1 | Polyester | 80 | 25 | 0.990 | 1.30 | 5 |
| B2 | Polyester | 90 | 25 | 0.985 | 1.28 | 3 |
| B3 | Polyester | 80 | 35 | 0.987 | 1.33 | 5 |
| C1 | Polyester | 50 | 25 | 0.960 | 1.29 | 15 |
| C2 | Polyester | 80 | 2.8 | 0.971 | 1.30 | 12 |
| C3 | Styrene acrylic | 50 | 25 | 0.989 | 1.28 | 6 |
| C4 | Styrene acrylic | 80 | — | — | — | — |

Example 1

Preparation of Polyimide Precursor Solution (PAA-1)

28 Parts by mass (96 parts by mole) of 3,3□,4,4□-biphenyltetracarboxylic dianhydride (BPDA), 10 parts by mass (96 parts by mole) of p-phenylenediamine (PDA), and 360 parts by mass of ion exchanged water are added to 170 parts by mass of the resin particle dispersion (B1), and the mixture is stirred at 20° C. for 10 minutes.

Next, 20 parts by mass (211 parts by mole) of N-methylmorpholine (organic amine compound) is slowly added. While held at a reaction temperature of 60° C., the mixture is stirred for 24 hours to dissolve the components and allowed to react to generate a polyimide precursor (A1) prepared from BPDA and PDA, and a polyimide precursor solution (PAA-1) is thereby obtained.

In the polyimide precursor solution (PAA-1) obtained, the content of the polyimide precursor is 6.5% by mass based on the total mass of the polyimide precursor solution. The content of the resin particles is 8.7% by mass, and the content of water is 84.8% by mass.

The weight average molecular weight of the polyimide precursor (A1) contained in the polyimide precursor solution (PAA-1) is 51000, and the imidization temperature Ti° C. of the polyimide precursor (A1) is 230° C.

The content of the particles based on the total mass of the polyimide precursor and the particles is 57% by mass.

Example 2

Preparation of Polyimide Precursor Solution (PAA-2)

A polyimide precursor solution (PAA-2) is obtained in the same manner as in Example 1 except that 170 parts by mass of the resin particle dispersion (B2) is used instead of 170 parts by mass of the resin particle dispersion (B1).

The content of the particles based on the total mass of the polyimide precursor and the particles is 57% by mass.

Example 3

Preparation of Polyimide Precursor Solution (PAA-3)

A polyimide precursor solution (PAA-3) is obtained in the same manner as in Example 1 except that 170 parts by mass of the resin particle dispersion (B3) is used instead of 170 parts by mass of the resin particle dispersion (B1).

The content of the particles based on the total mass of the polyimide precursor and the particles is 57% by mass.

Example 4

Preparation of Polyimide Precursor Solution (PAA-4)

A polyimide precursor solution (PAA-4) is obtained in the same manner as in Example 1 except that 330 parts by mass of the resin particle dispersion (B1) is used instead of 170 parts by mass of the resin particle dispersion (B1).

The content of the particles based on the total mass of the polyimide precursor and the particles is 73% by mass.

Example 5

Preparation of Polyimide Precursor Solution (PAA-5)

A polyimide precursor solution (PAA-5) is obtained in the same manner as in Example 1 except that 90 parts by mass of the resin particle dispersion (B1) is used instead of 170 parts by mass of the resin particle dispersion (B1).

The content of the particles based on the total mass of the polyimide precursor and the particles is 42% by mass.

Comparative Example 1

Preparation of Polyimide Precursor Solution (PAA-6)

A polyimide precursor solution (PAA-6) is obtained in the same manner as in Example 1 except that 170 parts by mass of the resin particle dispersion (C1) is used instead of 170 parts by mass of the resin particle dispersion (B1).

The content of the particles based on the total mass of the polyimide precursor and the particles is 57% by mass.

Comparative Example 2

Preparation of Polyimide Precursor Solution (PAA-7)

A polyimide precursor solution (PAA-7) is obtained in the same manner as in Example 1 except that 170 parts by mass of the resin particle dispersion (C2) is used instead of 170 parts by mass of the resin particle dispersion (B1).

The content of the particles based on the total mass of the polyimide precursor and the particles is 57% by mass.

Comparative Example 3

Preparation of Polyimide Precursor Solution (PAA-8)

A polyimide precursor solution (PAA-8) is obtained in the same manner as in Example 1 except that 170 parts by mass of the resin particle dispersion (C3) is used instead of 170 parts by mass of the resin particle dispersion (B1).

(Measurement of Breakdown Voltage)

The breakdown voltage (kV) of each of the porous polyimide films obtained is measured by the following method. The results are shown in Table 2.

Specifically, an AC voltage is applied between a twisted pair of wires and increased at 500 V/second according to JIS-C3216-5 (2011), and the voltage at which dielectric breakdown occurs is measured. The measurement of the breakdown voltage is performed with n=5, and the average value is determined. The results of the measurement of the breakdown voltage are shown in Table 2. The symbol "n" means the number of measurements.

TABLE 2

| | Dispersion | Ti – Tg (° C.) | Porosity (vol %) | Pore diameter (μm) | Circularity of pores | Remaining ratio (wt %) | Dielectric constant | Breakdown voltage (kV) |
|---|---|---|---|---|---|---|---|---|
| Example 1 | B1 | 150 | 50 | 25 | 0.987 | 1 | 2.0 | 7.0 |
| Example 2 | B2 | 140 | 50 | 27 | 0.981 | 4 | 2.1 | 8.0 |
| Example 3 | B3 | 150 | 50 | 35 | 0.984 | 1.5 | 1.9 | 7.5 |
| Example 4 | B1 | 150 | 70 | 23 | 0.986 | 3 | 2.0 | 9.8 |
| Example 5 | B1 | 150 | 40 | 28 | 0.987 | 0.5 | 1.7 | 5.8 |
| Comparative Example 1 | C1 | 180 | 50 | 23 | 0.955 | 2 | 2.1 | 0.9 |
| Comparative Example 2 | C2 | 150 | 50 | 2.8 | 0.965 | 2 | 5.5 | 3 |
| Comparative Example 3 | C3 | 180 | 50 | 27 | 0.984 | 15 | 10.1 | 0.5 |

The content of the particles based on the total mass of the polyimide precursor and the particles is 57% by mass.

<Evaluation>

The polyimide precursor solutions obtained in the Examples are used to produce porous polyimide films.

(Production of Porous Polyimide Films)

One of the polyimide precursor solutions obtained in the Examples is applied to a 10 cm×10 cm area of a glass substrate having a thickness of 1.0 mm using an applicator and dried in an oven at 80° C. for 30 minutes to thereby obtain a dried film. A gap of the applicator is adjusted such that the average thickness of the dried film is 300 μm.

The glass substrate with the dried film formed thereon is left to stand in an oven heated to 400° C. for 2 hours to fire the dried film and then immersed in ion exchanged water. The fired film is separated from the glass substrate and dried to thereby obtain a porous polyimide film. (Measurement of porosity, volume average diameter of pores, and average circularity of pores)

The porosity (porosity (vol %) in Table 2) of each of the porous polyimide films obtained, the volume average diameter of the pores (pore diameter (μm) in Table 2), and the average circularity of the pores (circularity of pores in Table 2) are measured by the methods described above, and the results are shown in Table 2.

(Measurement of Remaining Ratio of Particle Decomposition Products)

The remaining ratio of the particle decomposition products in each of the porous polyimide films obtained (remaining ratio (wt %) in Table 2) is measured by the method described above, and the results are also shown in Table 2.

(Measurement of Dielectric Constant)

The relative dielectric constant of each of the porous polyimide films obtained is measured by the method described above. The results are shown in Table 2.

As can be seen from the results shown in Table 2, the breakdown voltage of each of the porous polyimide films produced using the polyimide precursor solutions obtained in the Examples is higher than that in the Comparative Examples, and the insulating properties of the porous polyimide films produced using the polyimide precursor solutions obtained in the Examples are higher.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A polyimide precursor solution comprising:
   a polyimide precursor;
   polyester resin particles containing a polyester resin and having a volume average particle diameter of from 25 μm to 35 μm inclusive and an average circularity of 0.985 or more; and
   a solvent.

2. The polyimide precursor solution according to claim 1, wherein the polyester resin particles have a large-diameter side volume-based particle size distribution index of 1.50 or less.

3. The polyimide precursor solution according to claim 1, wherein the polyester resin particles have a glass transition temperature of from 50° C. to 100° C. inclusive.

4. The polyimide precursor solution according to claim 2, wherein the polyester resin particles have a glass transition temperature of from 50° C. to 100° C. inclusive.

5. The polyimide precursor solution according to claim 3, wherein the polyester resin is an aromatic polyester resin.

6. The polyimide precursor solution according to claim 1, wherein the value of Ti° C.-Tg° C. is 150° C. or less, where Ti° C. is the imidization temperature of the polyimide precursor, and Tg° C. is the glass transition temperature of the polyester resin particles.

7. A method for producing a porous polyimide film, the method comprising:
  applying the polyimide precursor solution according to claim 1 to a substrate to thereby form a coating;
  drying the coating to thereby form a dried film; and
  firing the dried film to imidize the polyimide precursor contained in the dried film and remove the polyester resin particles to thereby form a porous polyimide film.

8. A porous polyimide film, wherein the porous polyimide film is a porous fired product obtained from the polyimide precursor solution according to claim 1 and having pores.

9. The porous polyimide film according to claim 8, wherein the pores have a volume average diameter of from 25 μm to 35 μm inclusive and an average circularity of 0.985 or more.

10. An insulated wire comprising:
  a wire body; and
  the porous polyimide film according to claim 8, the porous polyimide film being disposed on a surface of the wire body.

* * * * *